United States Patent [19]

Colwell, Jr. et al.

[11] Patent Number: 4,632,690
[45] Date of Patent: Dec. 30, 1986

[54] HAZARDOUS WASTE REMOVAL METHOD AND APPARATUS

[76] Inventors: Robert E. Colwell, Jr., 2025 Post Rd., Vienna, Va. 22180; Glenn L. Shira, 8110 Hillcrest Dr., Manassas, Va. 22111

[21] Appl. No.: 741,246

[22] Filed: Jun. 4, 1985

[51] Int. Cl.$^4$ .............................................. C03B 5/04
[52] U.S. Cl. ........................................ 65/134; 65/135; 65/136; 65/335; 65/347; 422/168; 501/155
[58] Field of Search ................. 65/134, 135, 136, 335, 65/347; 422/168; 501/155

[56] References Cited

U.S. PATENT DOCUMENTS

| | | | |
|---|---|---|---|
| 1,596,058 | 8/1926 | Mambourg | 65/135 |
| 2,634,555 | 4/1953 | Henry et al. | 65/135 |
| 3,511,630 | 5/1970 | Hickey | 65/347 X |
| 3,515,529 | 6/1970 | Love et al. | 65/136 X |
| 3,614,079 | 10/1971 | Harrison et al. | 65/335 X |
| 3,656,928 | 4/1972 | Gimenez | 65/335 X |
| 3,837,832 | 9/1974 | Pecararo et al. | 65/136 X |
| 3,969,068 | 7/1976 | Miller et al. | 65/136 X |
| 4,298,372 | 11/1981 | Stover et al. | 65/347 X |
| 4,347,072 | 8/1982 | Nagaoka et al. | 65/135 |
| 4,414,013 | 11/1983 | Connell | 501/155 X |

Primary Examiner—Robert Lindsay
Attorney, Agent, or Firm—John J. Byrne; Bradford E. Kile; Kevin M. O'Brien

[57] ABSTRACT

A method and apparatus for the high temperature destruction by pyrolysis and incineration of organic and inorganic gaseous, liquid, and solid toxic and hazardous compounds. The apparatus has a melting chamber and a combustion chamber wherein solid, sludge liquid and gaseous compounds are separately or simultaneously eliminated. In the melting chamber of the apparatus, a molten mass media operates at temperatures between 2200 and 2900 degrees F. Directly above the molten mass a flame impinges upon the molten surface at a temperature of 3000 degrees F. and above. Solid, liquid, and gaseous hazardous wastes are introduced into the melting chamber either on or beneath the surface of the molten mass wherein the waste is destroyed. Due to the operating sequence of the apparatus, the liquid and solid waste compounds may be in the molten mass in excess of eight hours. In addition, hazardous liquids may be mixed with liquid fuels and introduced into the upper combustion chamber as the combustion media at temperatures of 3000 degrees F. Hazardous gases and particulate may also be introduced into the upper combustion chamber and mixed with the gases in the combustion media and are in the chamber in excess of four seconds. The final product is cooled and may be reused in part in a subsequent charging batch.

17 Claims, 6 Drawing Figures

HAZARDOUS WASTE REMOVAL METHOD AND APPARATUS

BACKGROUND AND FIELD OF INVENTION

The instant invention relates to a process and structure for destroying hazardous and toxic chemical wastes. In the context of the subject disclosure, the present invention shall be referred to as the Pyrolytic and Combustion Destruct System (PCDS).

Toxic chemical wastes in the environment represent one of the most serious problems facing society today the world over. Ever increasing quantities of these toxic residues have overburdened the receiving environment (air, water, and land) and in many cases it can no longer handle the increasing rate of industrial waste generation and disposal. Today, the greatest percentage of hazardous waste is managed by landfilling, however, current environmental laws strictly limit this method of hazardous waste management. Because of stringent controls placed on hazardous waste management, many industries have been and will continue to be forced to close or restrict operations.

The need for proper disposal and management of hazardous and toxic wastes is an accepted reality. Land disposal has resulted in contamination of rivers, streams, and aquifers. Incineration is an alternative disposal method for destroying organic wastes, however, there has heretofore been no system capable of destroying such waste at commercially practical volumes and without regard to the physical state of the waste. In sharp contrast, the present invention is a significant breakthrough in this field in that it disposes of a large variety of hazardous waste (gases, solids, and liquids) in large quantities, it generates a by-product which is recycled, and it is energy efficient.

Although a large variety of hazardous wastes can be destroyed by incineration, complete destruction of hazardous waste by the incineration processes of the prior art can be quite complex, with the combustion temperatures, dwell time, feed conditions, and the physical and chemical characteristics of the wastes varying widely. For example, in the case of dioxins, these substances may be bound to particulate matter so tightly that they pass undestroyed through typical incineration systems.

Most toxic organic chemicals can be completely destroyed at 1832 degrees F. with a residence time of two seconds. It is believed that polychlorinated biphenyls and dioxins require 2200 degrees F. and two seconds dwell time. However, many wastes are completely destroyed at lower temperatures and shorter dwell times.

By the subject invention, the destruction of these chemicals is accomplished by a combination of pyrolysis and oxidation reactions. Unlike prior waste removal systems, the PCDS provides a system for the destruction of hazardous and toxic organic substances by pyrolysis and/or combustion. As used herein, pyrolysis refers to a chemical change in a substance resulting from heat alone which involves the breaking of stable chemical bonds, often resulting in molecular rearrangement. Similarly, as used herein combustion refers to a chemical reaction which produces light and heat.

The PCDS accommodates solids, sludges, liquids, and/or gaseous organic wastes. If desired, the PCDS can also accommodate inorganic heavy metal wastes, such metals being entrapped in the glass when solidified. The heavy metals cannot be readily released to the environment through the glass and they are not collected in the ash since there is no ash associated with the system.

The PCDS utilizes state-of-the-art methodology similar to the process for the manufacture of glass whereby the finished product is initially in a molten state during the chemical reaction process, and then becomes a solid glass product at ambient temperatures of 2200 degrees F. Temperatures ranging from 2300 to 2900 degrees F. in the molten mass, with flame temperatures exceeding 3000 degrees F. and combustion gas in the 2700 degree F. range, are realized in the glass manufacturing process. The PCDS system has been designed to provide an overall method to handle a large variety of hazardous wastes regardless whether they are liquid, solid, sludge or gaseous. The purpose of the PCDS is not to make glass per se, but to use the molten mass as the media for destruction of the hazardous and toxic substances.

Among the advantages the system has over present hazardous waste removal systems are: (1) it is capable of handling several ton size quantities of waste per hour, (2) an average temperature of 2600 degrees fahrenheit can be achieved and maintained during the reaction process, (3) dwell time for solids and liquids in the molten mass is in hours rather than seconds, (4) gases are in the combustion chamber and regenerator for at least 8 seconds, (5) the PCDS is capable of handling inorganic as well as organix substances, (6) the products can be re-cycled as raw material, and (7) during an emergency shutdown, the destruct process is continued at high temperatures for at least four hours ensuring that hazardous wastes are not vented or otherwise released to the atmosphere.

A basic understanding of the glass making process is helpful in appreciating the subject invention. In this connection, glass is typically produced in a continuous tank wherein the molten glass is maintained at a constant level and raw materials are fed at a rate equal to that at which the finished product is withdrawn. A typical glass furnace consists of a charging chamber called a doghouse wherein raw materials are fed to a melting chamber, a refining chamber which receives heated molten glass from the melting chamber and holds it for a time to achieve a suitable working temperature for withdrawl of the glass as a molten mass, and a space above the molten glass called the combustion chamber which provides combustion space for the flame. Frequently, two regenerator checkers chambers and an exhaust stack each having secondary checkers chambers, and a flue are included to complete the major components of a glass furnace.

The basic raw materials for making glass are composed of three predominate oxides: silica dioxide (sand), sodium oxide or soda ash, and calcium oxide or lime. The composition of glass is often expressed in terms of these oxides. For example, a typical glass product may comprise approximately 75 percent sand, 17.5 percent soda ash, and 7.5 percent lime. The melting of glass is carried out at temperatures ranging from about 2370–2925 degrees F. The heat must be sufficiently intense to bring about the reactions between the ingredients of the raw materials and to dissolve the silica.

With regard to the interior of a typical glass furnace, a regenerative continuous bridge wall tank furnace is often used for the on-going process wherein the glass forms a pool in the heart of the furnace, across which the flames impinge directly upon the molten material and the raw materials.

Heat recovery is commonly utilized whereby heat of combustion is stored by absorbtion from the spent flame gases, and in a succeeding cycle of the operation this heat is used to raise the temperature of incoming combustion air. In such an arrangement, the furnace commonly operates in two cycles which may be understood by following the path of the gases of combustion. The flame gases, having spent their heat on the interior of the furnace, leave the combustion chamber at a temperature only slightly higher than that of the furnace walls and contents, that is about 2730-2920 degrees F. These gases pass through chambers stacked with open brickwork which are herein referred to as regenerators or checker chambers. The outgoing gases yield approximately half of their heat content to the checkers which reach temperatures ranging from about 2370 degrees F. at the top or furnace side to 1200 degrees F. at the bottom or the flue side. At regular intervals of about 20-30 minutes, or when the prescribed temperature rise has taken place in a regenerator, the flow of the air and the fuel gas is reversed. The air now rises through the hot regenerator, becoming preheated. At the top of the regenerator, air and combustion fuel are contacted in a furnace port and produce a flame, the intensity of which is increased by the preheating. Combustion gasses pass through the furnace to a furnace port on the other side of divider structure 24 and enter a duplicate set of regenerator checker chambers completing the second cycle of operations.

A glass furnace often includes a continuous bridge wall tank which is built in two chambers, a melting chamber and a refining chamber, separated by a bridge wall. The bridge wall is usually two-layered, with an air space therebetween for ventilation to cool the blocks and retard corrosion. A passage in the bridge wall called the throat located at or near the bottom of the bridge wall leads the glass from the melting chamber to the refining chamber. A typical melting chamber of a 90 ton per day furnace is 16 feet wide, 24 feet long to the bridge wall, and 3 feet deep. The width gives ample distance for flame travel and the length provides the necessary area under the flame. The tank may be built, for example, of rectangular refractory blocks 12 inches thick and laid close together without mortar or cement. Since the outer surfaces of the blocks are exposed to the air and are relatively cool, the glass cannot penetrate a significant distance between the joints of the blocks without becoming so cold and stiff that it cannot flow out.

The bottom blocks may be of any suitable size to make up the required area of the melting chamber and should preferably extend about 1 foot in each direction from the outside dimension of the melting tank. The bottom blocks may be laid on a series of iron rods, for example, about ¾ inch in diameter and laid across 6 inch I-beams spaced 18 to 24 inches apart. These are preferably supported on girders of 10 or 12 inch I-beams running longitudinally and resting on brick piers rising from a basement beneath the tank. The basement, which is approximately 15 feet deep, is necessary to provide the required height for the regenerator chambers. The side walls of the chambers may be, for example, 42 inches high and built of refractory blocks 18 to 24 inches wide.

At the back or the charging end of the melting chamber, there is a vestibule known as the doghouse. The doghouse is covered and provides an area wherein the batch is sintered before becoming exposed to the full velocity of the flames. At the front end of the melting chamber there is an opening which may be about 24 inches wide and 12 inches high known as the throat. This is built into the bridge wall with the opening flush with the bottom of the tank. The temperature of the refining chamber is normally about 572 degrees F. lower than that of the melting chamber.

Above the surface of the molten glass in a glass furnace is a combustion chamber commonly referred to as a superstructure for the flame as well as the final covering or crown. The superstructure typically consists of refractory walls called breast walls rising about two feet above the top of the blocks and supporting a crown arch on skew blocks. The breast walls may be offset 12 inches to the outside and are supported on steel members carried on brackets on the vertical buckstays, which brace the entire structure together.

The I-beams carrying the bottom blocks may project about 2 feet on either side; and on their outer ends are bolted heavy angle irons called heel plates, to carry the bottom ends of the buckstays. The buckstays rise above the height of the crown and are fastened together at the tops by tie rods at least 1½ inch in diameter, and thus carry the horizontal thrust of the crown arch. The tie rods are threaded and provided with nuts which can be adjusted to allow for expansion as the furnace is heated. The crown of the melting chamber is typically an arch with a radius equal to its span. In a 90 ton per day unit this radius could be about 26 feet.

A glass furnace typically includes air ports in the wall through which fire enters the combustion chamber from a checkers chamber. Gas and air meet in the port neck, several feet from the inside of the wall, so that combustion is well under way as the mixture enters the tank. Fuel is fed through nozzles over ports, under ports, or in the sides of the port necks, directed towards the combustion chamber.

These burner nozzles are directed toward the batch of glass and at an angle toward each other so that the streams of gas cut across the stream of air, meeting in front of the port area.

Regenerator checkers chambers often are located behind the charging end of the melting compartment. In the unit described above, these chambers may have dimensions of about 8 feet wide, 14 feet long, and 12 feet high. The chambers are partitioned by a wall of fire and brick. The flues of exhaust stacks are spanned by rider arches to carry the firebrick checkers. The flues are frequently connected to two secondary checkers chambers. These secondary checkers are connected at one end to the stack for releasing the inert gases generated via the detoxication process to the atmosphere, and at the other end to a respective primary checkers chamber.

In addition, between the bridge wall and between the blocks and the buckstays, jack bolts, adjustable by turnbuckles, retain the block walls in position against the thermal expansion of the refractories and against the pressure of the molten glass. A system of wind pipes and nozzles for cooling the outside of the melting chamber walls and the melt line is generally required to retard corrosion.

OBJECTS AND SUMMARY OF THE INVENTION

Objects

It is a general object of the present invention to provide a hazardous waste removal system capable of eliminating a relatively large variety of wastes.

It is a particular object of this invention to provide a hazardous waste removal system capable of simultaneously eliminating solid, sludge, liquid and gaseous wastes.

It is another object of this invention to provide a hazardous waste removal system capable of eliminating dioxin and PCB materials.

It is yet another object of this invention to provide a hazardous waste removal system which is energy efficient.

It is a still another object of this invention to provide a hazardous waste removal system capable of eliminating wastes in relatively large quantities.

It is a further object of this invention to provide a process for eliminating a relatively large variety of hazardous wastes.

It is still a further object of this invention to provide a process for eliminating hazardous wastes in relatively large quantities.

It is yet a further object of this invention to provide a process for eliminating hazardous wastes containing dioxins.

It is yet a further object of this invention to provide a process for eliminating hazardous wastes which is energy efficient.

It is still a further object of this invention to provide a process for eliminating hazardous wastes which produces essentially no ash or carbonaceous residue.

It is still a further object of this invention to provide a process for eliminating hazardous wastes whereby some or all of the solid product is recycled as a raw material to the process.

SUMMARY OF THE INVENTION

One preferred embodiment of the invention which is intended to accomplish at least some of the foregoing objects comprises a a glass making furnace having a melting chamber for melting and heating materials contained therein, a refining chamber connected to said melting chamber via a ventilated throat in a bridge wall and having a glass exit port, a first doghouse for entering materials into said melting chamber, a burner unit for melting said raw materials into a molten mass and for heating said molten mass, a first and second primary checkers chamber connected to said combustion chamber via a respective air port, a divider structure separating said primary checkers chambers and respective air ports corresponding thereto, at least one secondary checkers chamber coupled to said primary checkers chambers and to at least one stack including a flue for causing circulation of air flow in alternate directions through the combustion chamber, at least one hazardous gas injection port coupling to each said primary checkers chamber for injecting gaseous hazardous waste thereto; and at least one hazardous liquid injection port coupling to said melting chamber for injecting liquid hazardous wastes directly into said melting chamber.

The process for removing hazardous waste in a glass making furnace having a melting chamber, a refining chamber, a checkers chambers, doghouse, and a stack according to a preferred embodiment of the invention comprises the steps of generating an extended flame having a first directed path in a combustion chamber immediately above said melting chamber, said flame directly impinging on a surface of molten mass contained in said melting chamber and said molten mass being largely comprised of raw materials for making glass; injecting into said molten mass in said melting chamber liquid solid or sludge type hazardous or toxic waste material through said doghouse; continuing heating said molten mass by said flame while convection currents are naturally formed to circulate said molten mass in said melting chamber; transferring said molten mass from said melting chamber to said refining chamber upon neutralization of certain hazardous or toxic waste material embodied therein; and pouring resulting glass product from said working chamber. THE DRAWINGS Other objects and advantages of the present invention will become apparent from the following detailed description of a preferred embodiment taken in conjunction with the accompanying drawings wherein:

DETAILED DESCRIPTION

Figure 1A:
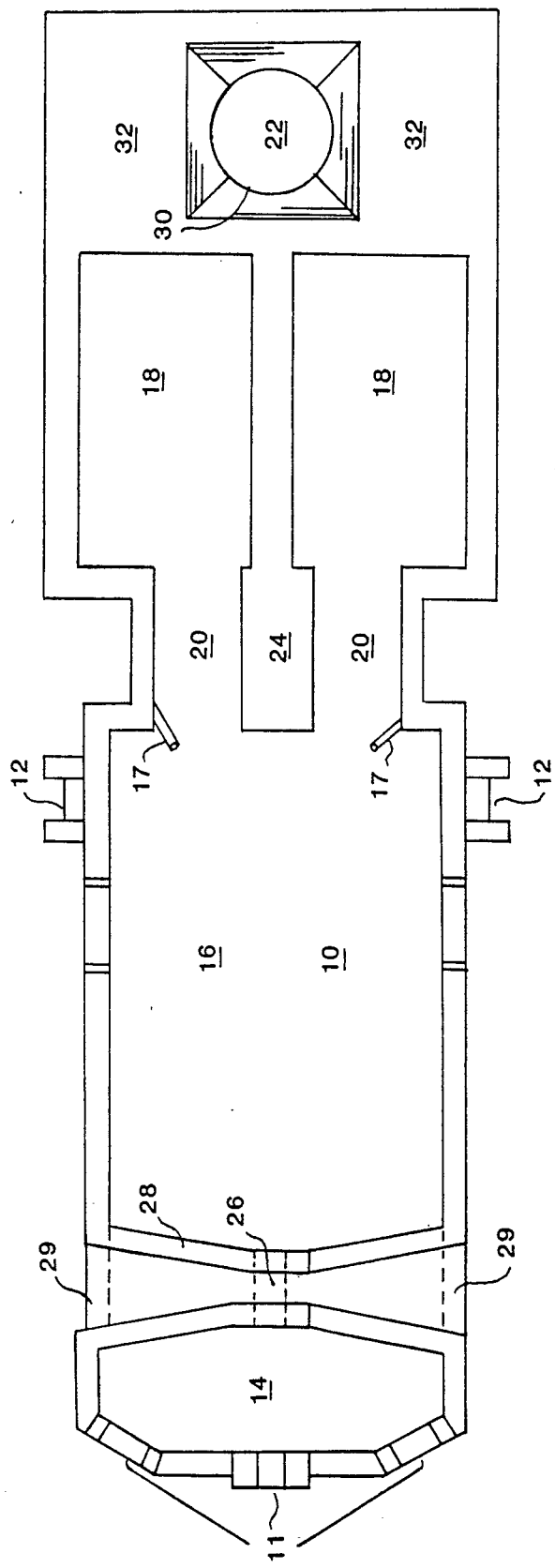
FIG. 1A is a top view of a typical glass making furnace.
Figure 1B:
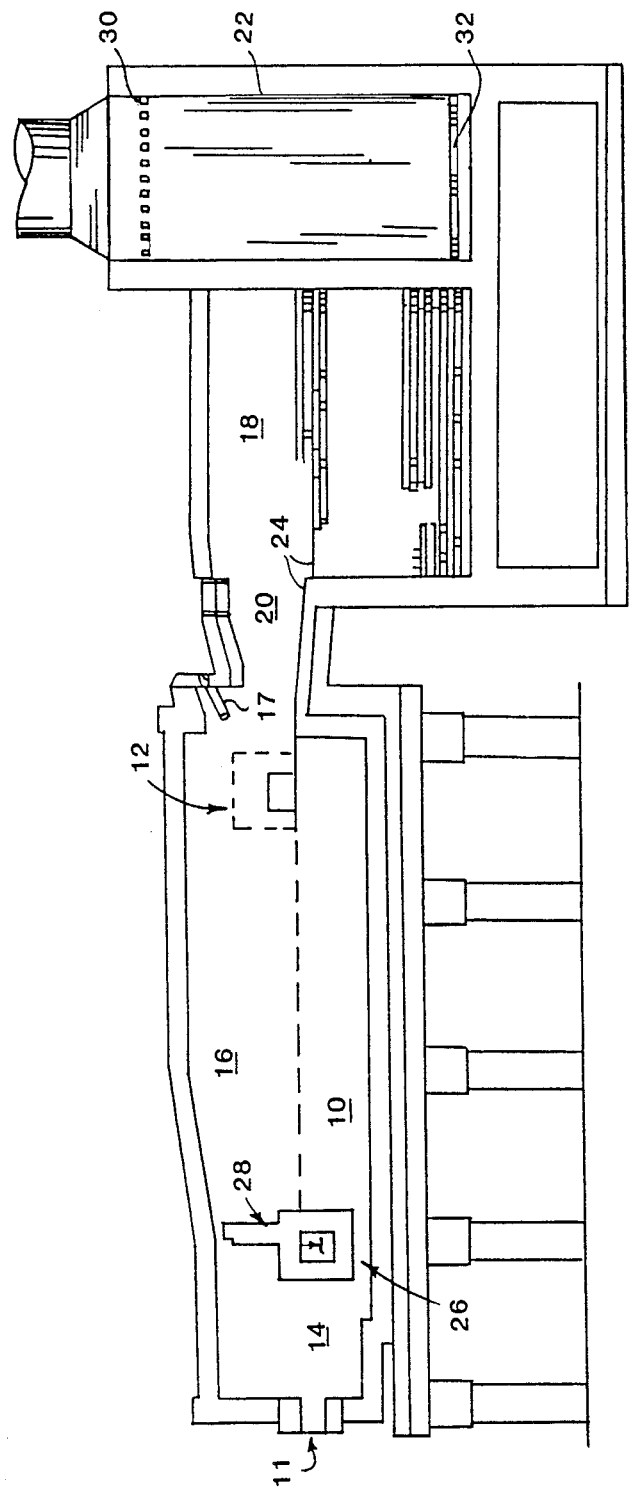
FIG. 1B is a side view of the glass making furnace shown in FIG. 1A.

Referring now particularly to FIGS 1A and 1B wherein a conventional regenerator type glass furnace is illustrated respectively in top and side view. A melting chamber 10 is shown holding a volume of molten mass therein and a refining chamber 14 having glass exit ports 11 is shown coupled to the melting chamber 10 via a throat connection 26 which is ventilated by ventilation port 29. Molten glass flows from the melting chamber to the refining chamber and then out through the exit port 11. Reference numeral 24 designates a divider wall separating a dual set of primary checkers chambers 18 which are coupled to a single secondary checkers chamber 32 beneath the stack 22. The stack includes a flue which draws air and creates air flow from one primary checkers chamber to the other through the combustion chamber 16 above the melting chamber 10. Reference numeral 20 designates respective air port openings leading from a primary checkers chamber 18 to the combustion chamber 16. A doghouse 12 located on either side of the melting chamber serves to inject raw materials of glass into the melting chamber. A burner unit 17 is located in said air ports with fuel injection nozzles 17 directed towards the interior of the combustion chamber. The raw materials of glass are heated and churned in the melting chamber until becoming molten glass suitable for removal from the furnace.

In one embodiment, the PCDS apparatus comprises a configuration of an adapted glass furnace for destroying hazardous and toxic waste. In a typical glass-making operation as described above, raw materials are mixed and charged into the melting chamber through the dog house by either a batch or continuous process. In the instant invention, liquid and solid waste materials may be mixed with the raw materials of glass or recycled cullet prior to being charged into the melting chamber. In the melting chamber, the charged materials are heated to temperatures of around 2700 degrees F. Since the temperature is not constant in all horizontal planes in the melting chamber, convection currents are established which serve to thoroughly mix the waste materials and to homogenously distribute these materials in the molten glass within the melting chamber. Liquid and gaseous waste may also be injected through the side wall or bottom of the chamber. Due to the viscosity of the glass and the convection currents within the chamber, the wastes are thoroughly mixed and converted to non-hazardous products. Should fuel oil be used in the combustion process, liquid waste products can be mixed with the fuel which will serve to destroy this waste material since the flame temperature is in excess of 3000 degrees F. Fuel injection nozzles are preferably located above the molten mass and adjacent one end of the melting chamber, directed towards the surface of molten mass and the other end of the melting chamber to provide an elongated flame. The nozzles operate in alternate succession for coordination with alternating air flow in the combustion chamber. As the fuel is combusted and the flame impinges on the surface of the molten glass it forms gaseous products in excess of 2700 degrees F. Hazardous waste products in the form of gases and particulate may be injected into these extremely hot combustion gases and destroyed prior to removal through the stack.

The present invention preferably utilizes a regenerator type chamber which allows the gas to flow through a primary secondary generator before exiting through the stack. This allows gases to remain in the PCDS chambers at extremely high temperatures for at least 8 seconds, thus insuring complete destruction of hazardous products. During normal operations, air pollution control devices are used on the stack to collect particles. If desired, the particulate gathered during the pollution control process can be recycled with the raw material.

As previously mentioned, silica dioxide (sand), sodium oxide (soda ash), and calcium oxide (lime) are the three major ingredients for making glass. The composition of a typical glass product expressed in percentages of the compounds is approximately 75% sand, 17.5% soda ash, and 7.5% lime. In a 90 ton per day furnace, 3.75 tons (7,500 pounds) of raw material are charged into the melting chamber every hour. Simultaneously, 3.75 tons of molten glass are extracted. The weight of each ingredient of material charged into the furnace each hour is:

Sand = 75.0% × 7,500 = 5625 lbs.

Soda ash = 17.5% × 7,500 = 1312 lbs.

Lime = 7.5% × 7,500 = 562 lbs.

When a glass batch is mixed, waste glass referred to as cullet is often mixed with the raw materials. The usual proportion of cullet, which has preferably been crushed to a fine mesh, is between one fourth and one-half of the total charge. These raw materials and cullet are typically automatically weighed and mixed.

The mixing is a rotary operation whereby blades, which act as shovels, lift and spread the material effectively. The batch can be made into pellets by wetting the batch with a liquid bonding agent. The mix is then pelletized by a forming machine.

Forming the batch into pellets eliminates the loss and inconvenience of dusting both during the mixing and charging of the batch and during the melting operation. During start up, several batches of raw material are charged into the furnace for the purpose of making cullet. After several batches of glass have been manufactured for this purpose, hazardous waste is then charged to the furnace.

The solid hazardous waste material to be destroyed, for example contaminated soil, will be contained in an enclosed controlled area. In a preferred embodiment, a batch of raw material is weighed and mixed with an amount of solid waste which equates to up to 35% by weight of the raw material. For example, the total weight of each batch is 7,500 pounds, up to 35%, or 2,625 pounds of waste is added to the basic batch. The waste is thoroughly mixed with the raw materials and pellitized through methods well known in the art. These pellets are fed directly to the mechanical feeding device without exposure to the open atmosphere.

A feeding mechanism such as a rotating screw type feeder, which operates in a water cooled cylinder, is preferably sealed in the back wall of a closed dog house to avoid heat loss. The feeding mechanism may be automatically operated to systematically charge the melting chamber with pellets that equates to 7,500 pounds per hour.

Inside the PCDS, glass formation is carried out at a relatively high temperature, for example, at about 2850 degrees F. The PCDS is at full heat when it receives the charge, and in the case where the charge contains hazardous waste, the melting chamber is filled with molten glass. The pellet charge arrives directly upon the molten glass and is immediately exposed to the full heat of the furnace.

Within the melting chamber, currents exist having their origin in the displacement of lighter hot molten glass, by heavier cooler molten glass. In a continuous wall tank of the bridge-wall type at least three principal types of such currents have been identified. Since the center of the tank is hotter than the sides, a pair of elliptical currents are set up passing from the central portion of the surface toward the side walls, down the cool walls and along the bottom to the center, where the molten glass again rises. Since the charging end of the tank and the bridge wall is cooler than the central portion, a flow is set up traveling back from the hot spot on the surface toward the charging end, with a similar surface flow traveling toward the bridge wall. The glass in these currents finds its way down the end walls and along the bottom to rise again under the hot spot. The third type of current is that which flows up to the surface as the glass passes through the throat into the working chamber, down the breast wall, and back along the bottom to the throat. These currents are shown by arrows in FIGS. 2A and 2B which illustrate respectively a top and side view of the PCDS system structure. Advantages of these currents are they help to mix the ingredients of the glass and the hazardous waste making it is homogeneous mix. The convection currents from the hot spot toward the back wall of the tank are a considerable aid to melting operations since they serve to prevent partially melted ingredients from passing rapidly down the tank and being drawn into the refining end. Convection currents are caused by the lower density of glass in the center of the tank and are limited by the rate at which heat can pass down into the mass of glass.

Figure 2A:
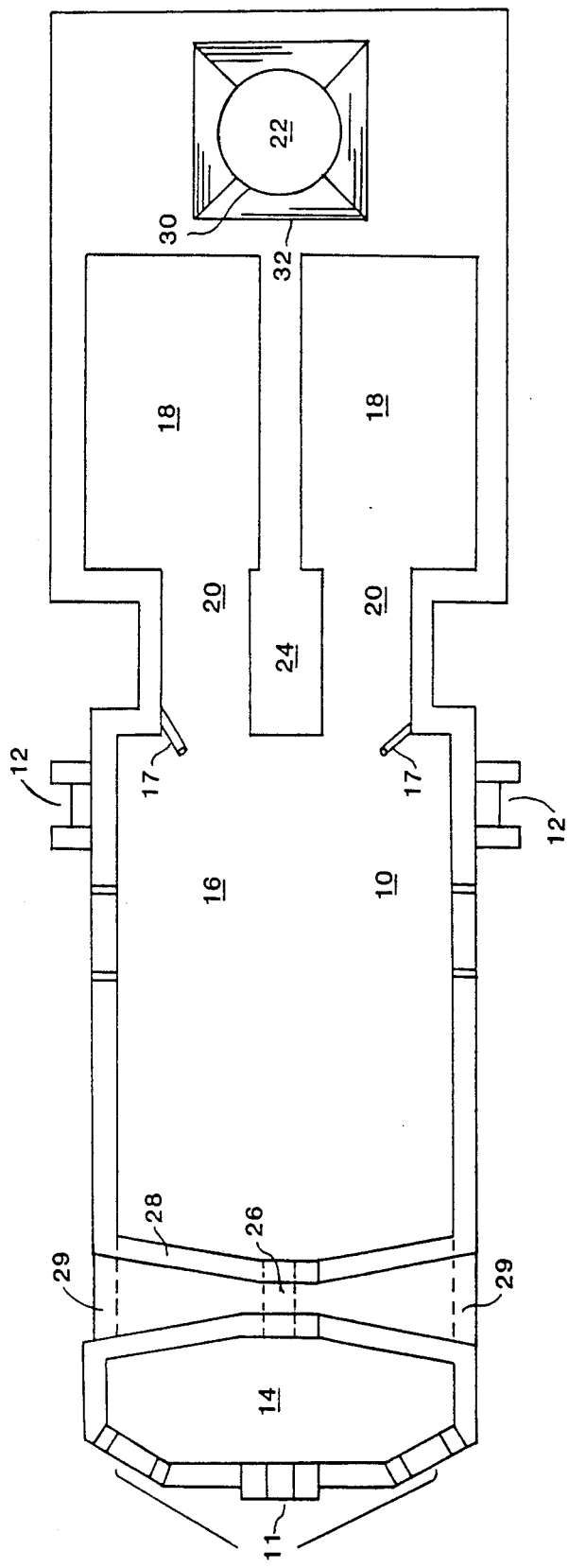
FIG. 2A is a top view of the PCDS of the present invention.
Figure 2B:
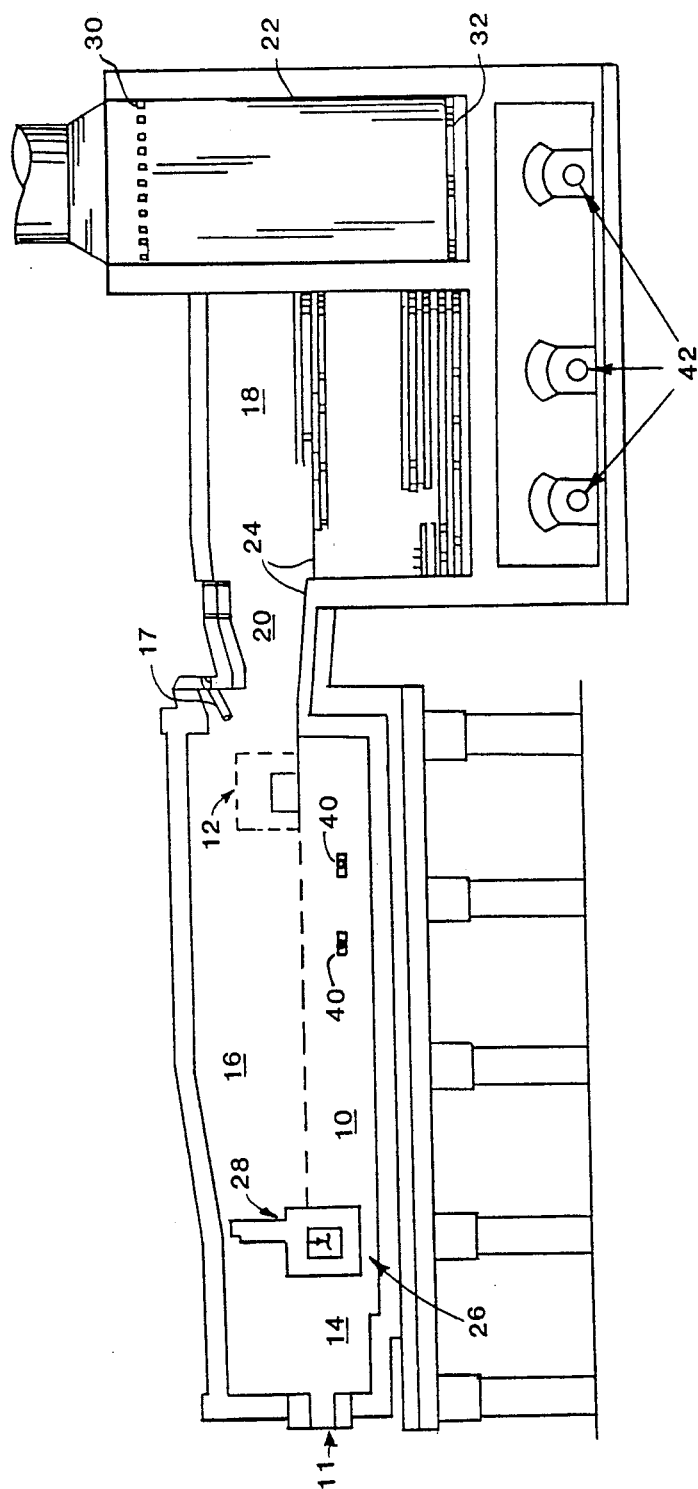
FIG. 2B is a side view of the PCDS as shown in FIG. 2A.

In FIGS. 2A and 2B, like numerals indicate like parts as in FIGS. 1A and 1B which illustrate a conventional regenerator type glass furnace. The particular PCDS system structure shown in FIGS. 2A and 2B has but only one stack, although more may be used as in the structure of FIGS. 1A and 1B.

During the melting process, it is believed that the alkali members of the batch begin almost immediately to fuse and alkali silicates are produced. As silica and other infusible constituents are dissolved, gases are liberated from carbonates and from hydrates, nitrates, and sulfates. The mass is agitated by these escaping gases which aids the mixing process. The cullet entering with the charge also assists in dissolving the less soluble ingredients.

As the batch melts, air trapped between the sand, soda ash, and lime, and the carbon dioxide and other gases set free by chemical reactions, create bubbles. Large bubbles, with a diameter greater than one millimeter escape from the melting glass, however, the time required for a one millimeter bubble to rise one meter in the molten glass is approximately 1.4 hours. The fine bubbles, less than 0.1 millimeter in diameter require a relatively long time to be eliminated simply by rising to the surface. In fact, it is estimated that 140 hours are required for a 0.1 millimeter bubble to rise one meter in the molten glass. Since gases dissolve in liquids, the tiny bubbles which have a large amount of surface for their volume will frequently disappear as the gas diffuses into the glass.

Viscosity is an important property of glass which not only makes possible the glassy state but also controls the rise of bubbles from the melt—the refining process. A high temperature and a resultant lessening of viscosity is necessary in order to clear the glass of bubbles. The viscosity of glass changes more rapidly at low temperatures than it does at the operating temperatures of the melting furnace. When the glass is cooled to about 750 degrees F., the glass becomes practically rigid.

Liquid wastes may be injected into the PCDS system via one of two ways. As shown in FIGS. 2A and 2B, a number of liquid waste injection ports 40 are arranged on the side walls of the melting chamber 10. These ports may also be located at the bottom of the melting chamber; their main purpose is for injecting liquid waste material directly into the molten mass within the melting chamber while the molten mass is in the molten state. Liquid wastes such as PCB may be mixed in appropriate proportions with the injected fuel via a fuel nozzle 17 in this manner, the liquid waste is directly amidst the combustion flames.

A mixture of solid and liquid wastes constituting a sludge type mixture combination may also be injected into the melting chamber via a dog house 12. The dog house is a multipurpose injection port able to inject wastes in generally solid or sludge forms. In a preferred embodiment of the PCDS system, one doghouse is located on each side of the melting chamber across from the divider structure 24.

Gaseous wastes may be injected via injection ports 42 shown in FIGS. 2A and 2B. From there, they are mixed with warm air in a primary checkers chamber 18 and drawn into the combustion chamber 10 via an air port 20 due to air flow action caused by a flue 30 in stack 22. In this manner, gaseous wastes are directly exposed to flames in the combustion chamber. Due to the air flow, flame originating from one burner nozzle extends toward the bridge-wall 28 and around towards the other side of the combustion chamber 16 as shown in double arrows. This elongated flame path enables thorough destruction of the gaseous wastes. A dwell time of eight seconds is preferably achieved for such gaseous wastes in the furnace and checkers chambers to ensure complete destruction of the gaseous wastes.

Figure 3A:
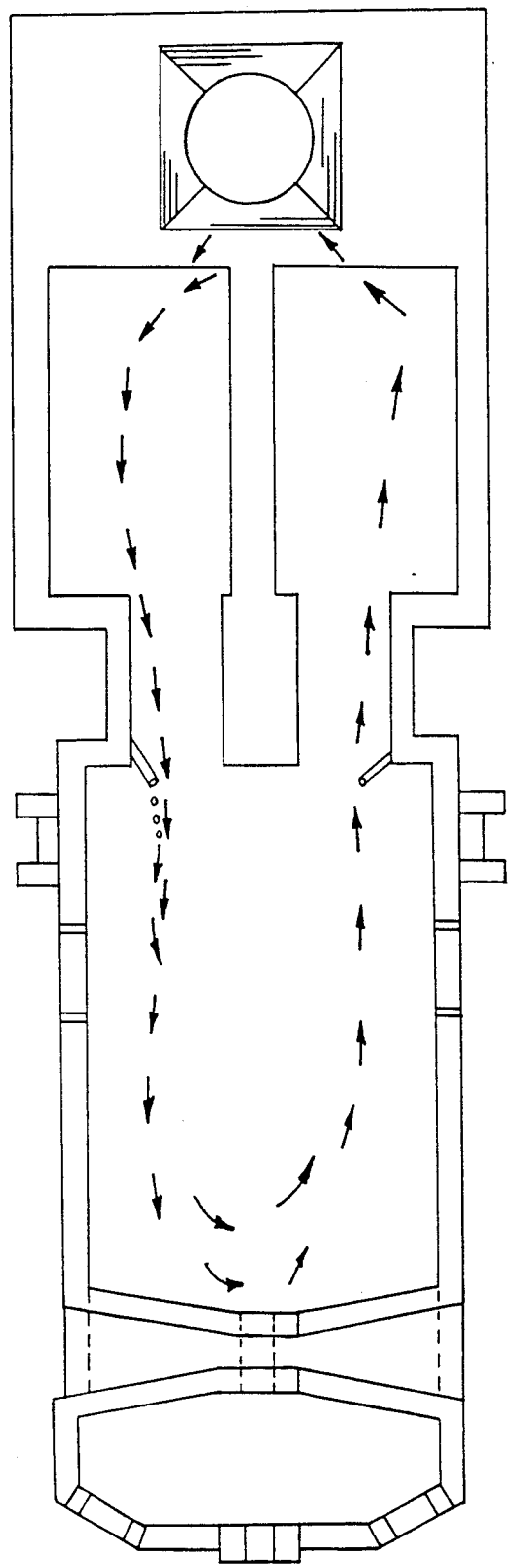
FIG. 3A is an illustration of the path of air flow and directed flame in one cycle of operation of the PCDS system.
Figure 3B:
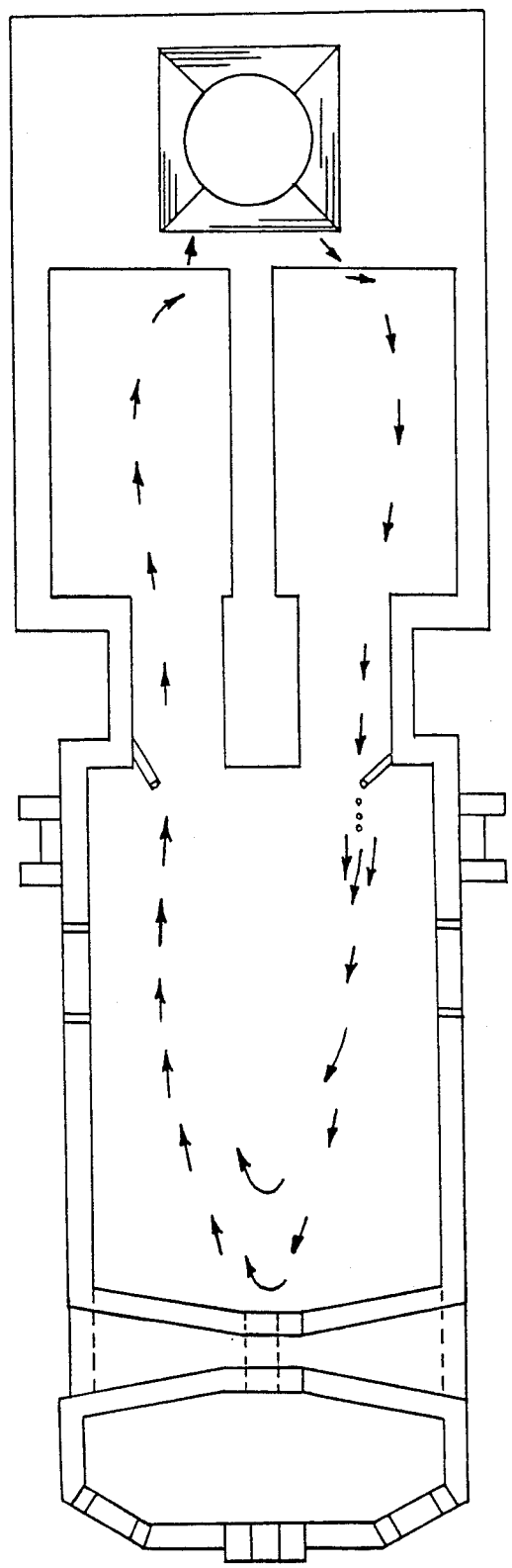
FIG. 3B is an illustration of the path of air flow and directed flame in another cycle of operation of the PCDS system.

The stack 22 via its flue structure 30 and a secondary checkers chamber 32 on the base thereof causes alternating air flow from a primary checkers chambers 18 on one side of the combustion chamber 16 to another primary checkers chamber 18 on the other side. This air flow action is illustrated (in double arrows) in FIGS. 3A and 3B. While air flow is as shown in FIG. 3A, the fuel nozzle on side A is operative for supplying combustion flames (in single arrows) to be carried in a counter clock-wise direction. While air flow is as shown in FIG. 3B, the fuel nozzle on side B is operative for supplying combustion flames to be carried in a clock-wise direction. In this manner, injected gaseous wastes are first preheated via temperatures in a checkers chamber 18 and then drafted into a circulating air flow through the combustion chamber 16 to another checkers chamber 18 on the opposing side of divider structure 24. Of course, more than one such stack may be accommodated in parallel, if desired.

The alternating air flow switches in succession every 20–30 minutes. The air temperature at top of the primary checkers chamber is about 2800 degrees F. and 1100 degrees F. at the bottom of the secondary checkers chamber 30. The fire bricks surrounding the checkers chambers absorb and retain heat for lessening heat dissipation. The hot preheated air from the checkers chambers makes the PCDS an efficient system minimizing fuel costs. The air when traveling through the combustion chamber amidst the flames is believed to reach 3000 degrees F. and a dwell time of at least 8 seconds is achieved.

In one embodiment of the invention, the circulated air is vented outdoors via stack 22; however, in another embodiment, the entire PCDS may be a closed system wherein the circulated air from the stack may re-enter the air flow paths via gaseous waste injection ports 42. Furthermore, in another embodiment, if the PCDS is located next to a conventional municipal furnace, the exhaust therefrom may be channeled to the gaseous waste injection ports 42. In the alternative, the PCDS need not be entirely closed, and some air may be recirculated while some released. But in either case, any released air would not contain hazardous or toxic wastes.

The circulated hot air may even be routed to vaporize water in an aqueous sludge of waste material before the material is injected into the melting chamber via the doghouse.

The PCDS system provides many different possibilities for preparing and injecting solid, liquid, gaseous, and sludge type waste material into the melting chamber. One with ordinary skill in the art can recognize many different alternatives not limited to only those specifically discussed herein.

Subsequent to sufficient dwell time in the melting chamber, the molten mass containing destroyed waste materials is guided toward refining chamber 14 via a throat channel 26. A ventilation port 29 envelops the throat for bringing in cool air to lower the temperature of molten mass as it passes through throat 26 into the refining chamber 14 and to retard corosion of the fire brick as is the case in a conventional glass furnace. From the refining chamber the molten glass mass is poured from glass exit ports 11 to be sent to land fills and/or recycled as cullets to be charged into the melting chamber via a doghouse.

Structurally, the apparatus of the present invention employs a furnace similar to the type shown in FIGS. 1A and 1B. The PCDS structure is illustrated respectively in FIGS. 2A and 2B in top and side views. Hazardous gas injection ports 42 are added on both sides of the furnace for connection to the primary checkers chamber, and hazardous liquid injection ports 40 are added on both sides and/or in the bottom of the furnace for direct injection of liquid wastes into the melting chamber. In a preferred embodiment, a doghouse is provided on each side of the adapted furnace structure so that waste materials can be charged into the melting chamber in coordination with the activation of alternate nozzles on either side and alternate direction of air flow in the combustion chamber.

In describing the invention, reference has been made to a preferred embodiment. Those skilled in the art, however, and familiar with the disclosure of the subject invention may recognize additions, deletions, substitutions, modifications and/or other changes, which will fall within the purview of the invention as defined in the following claims.

What is claimed:

1. In a glass making furnace having a melting chamber for melting and heating materials contained therein, a refining chamber connected to said melting chamber via a ventilated throat in a bridge wall and having a glass exit port, a first doghouse for entering materials into said melting chamber, a burner unit for melting said raw materials into a molten mass and for heating said molten mass, a first and second primary checkers chamber connected to said combustion chamber via a respective air port, a divider structure separating said primary checkers chambers and respective air ports corresponding thereto, at least one secondary checkers chamber coupled to said primary checkers chambers and to at least one stack including a flue for causing circulation of air flow in alternate directions through the combustion chamber, the improvement comprising:
at least one hazardous gas injection port coupling to each said primary checkers chamber for injecting gaseous hazardous waste thereto;
at least one hazardous liquid injection port coupling to said melting chamber for injecting liquid hazardous wastes directly into said melting chamber.

2. A furnace according to claim 1 further comprising:
a second doghouse for entering materials into said melting chamber;
said first doghouse being located on one side of an imaginary axis coaxial with said divider structure, and adjacent a side wall of said melting chamber; said second doghouse being located on an opposing side of said imaginary axis, and also adjacent a side wall of said melting chamber.

3. A furnace according to claim 1 or 2 further comprising a combustion chamber directly above a surface of molten mass in the melting chamber;
said burner having a first and second fuel injection nozzle respectively located on opposing sides of an imaginary axis coaxial with said divider structure, and pointed at an angle towards said surface and said bridge wall;
said first and second nozzles being activated in alternate succession to produce a series of extended flames together with air flow from a corresponding checkers chamber, in opposite directions at least partially around said combustion chamber.

4. A furnace according to claim 1 wherein there is at least one said hazardous liquid injection port on each side of an imaginary axis coaxial with said divider structure.

5. In a regenerator type glass furnace having a melting chamber, a refining chamber, a doghouse, a plurality of checkers chambers and a stack, a process for neutralizing hazardous or toxic waste material comprising the steps of:
generating a flame in a combustion chamber immediately above said melting chamber, said flame directly impinging on a surface of molten mass contained in said melting chamber and said molten mass being largely comprised of raw materials for making glass;
injecting into said molten mass in said melting chamber solid or sludge type hazardous or toxic waste material through said doghouse;
continuing heating said molten mass by said flame while circulating said molten mass in said melting chamber;
transferring said molten mass from said melting chamber to said refining chamber upon destruction of certain hazardous or toxic waste material embodied therein; and
recovering a resultant glass product from said refining chamber.

6. A process according to claim 5 wherein said flame has an average temperature of approximately 3000 degrees F. and said molten mass has a temperature of from approximately 2300 degrees F. to 2900 degrees F.

7. A process according to claim 6 and further comprising:
injecting liquid hazardous waste material into said molten mass via at least one liquid injection port in said melting chamber of said furnace.

8. A method according to claim 7 further comprising:
directing air flow from one of said checkers chamber through said combustion chamber to another of said checkers chamber, by means of said stack; and
injecting gaseous hazardous waste material into said one of said checkers chambers for introduction to said combustion chamber through at least one gaseous waste injection port.

9. A process according to claim 8 and further comprising:
reversing direction of said air flow at regular intervals.

10. A process according to claim 9 wherein said flame extends in a direction corresponding to current air flow.

11. A process according to claim 5, 7 or 8 and further comprising:
mixing combustion fuel with liquid hazardous or toxic waste material;

spraying said mixture from at least one fuel nozzle into said combustion chamber.

12. A process according to claim 5 or 8 further comprising the following step:

recycling at least a portion of said recovered glass product into said melting chamber via said at least one doghouse.

13. A process according to claim 5 or 8 further comprising the following step:

recycling said recovered glass product into said melting chamber via said at least one doghouse.

14. A process according to claim 5 further comprising the following step:

ventilating said molten mass as it passes from said melting chamber to said refining chamber.

15. A process according to claim 8 wherein said furnace comprises two doghouses spaced across said melting chamber and whereby said injecting step for solid or sludge type hazardous or toxic waste material comprising the further step of:

selectively employing a respective one of said two doghouses depending on which one is upstream of said air flow.

16. A process according to claim 8 whereby the dwell time of said injected gaseous waste material in said furnace is at least 8 seconds.

17. A process according to claim 12 wherein said recovered glass product is cooled prior to recycling.

* * * * *